(12) United States Patent
Palanki

(10) Patent No.: US 12,626,168 B2
(45) Date of Patent: May 12, 2026

(54) ENHANCING API ACCESS CONTROLS WITH MARKOV CHAINS AND HIDDEN MARKOV MODELS

(71) Applicant: American Express Travel Related Services Company, Inc., New York, NY (US)

(72) Inventor: Hiranmayi Palanki, Tampa, FL (US)

(73) Assignee: American Express Travel Related Services Co., Inc., New York, NY (US)

( * ) Notice: Subject to any disclaimer, the term of this patent is extended or adjusted under 35 U.S.C. 154(b) by 1028 days.

(21) Appl. No.: 17/749,502

(22) Filed: May 20, 2022

(65) Prior Publication Data

US 2023/0376811 A1 Nov. 23, 2023

(51) Int. Cl.
*G06N 7/01* (2023.01)
*G06F 21/60* (2013.01)
(52) U.S. Cl.
CPC ............. *G06N 7/01* (2023.01); *G06F 21/604* (2013.01)
(58) Field of Classification Search
CPC ................................. G06N 7/01; G06F 21/604
See application file for complete search history.

(56) References Cited

U.S. PATENT DOCUMENTS

| | | | |
|---|---|---|---|
| 11,770,377 B1* | 9/2023 | Mital ...................... | H04L 63/10 726/4 |
| 2005/0234906 A1* | 10/2005 | Ganti .................... | G06F 16/258 707/999.005 |
| 2020/0334376 A1* | 10/2020 | Bragdon ............. | G06F 21/6245 |

* cited by examiner

*Primary Examiner* — Hee K Song
(74) *Attorney, Agent, or Firm* — Thomas Horstemeyer, LLP

(57) ABSTRACT

Disclosed are various approaches for using Markov chains and hidden Markov Models to enhance API access controls for secure data. Various embodiments disclosed in this application introduce an access control application between the APIs and a data store that uses Markov chains or hidden Markov models to validate, check, or verify that the data request meets expected security guidelines. These embodiments can enhance security for all requests for data. Additionally, these embodiments can serve as an additional, automated security defense when a developer misconfigures or fails to include the appropriate validation logic within an API.

20 Claims, 9 Drawing Sheets

136

Start

Identify Access Control States     503

Determine State Transition Pattern     506

Determine State Transition Probabilities     509

Identify Token Validation Responses     512

Determine Token Validation Response Probabilities     515

End

136

Start

Receive Token — 803

Identify Plurality of States — 806

Determine a First State from the Plurality of States — 809

Identify State Transition Probabilities between First State and the Plurality of States — 812

Choosing a Second State from the Plurality of States — 815

Validate Token Against the Second State — 818

End

ENHANCING API ACCESS CONTROLS WITH MARKOV CHAINS AND HIDDEN MARKOV MODELS

BACKGROUND

Software systems can use a set of Application Programming Interfaces (APIs) as a way to access stored data. In many implementations, developers of each API can be responsible for determining whether a client's request to access the stored data is valid. In development teams having many developers writing and managing these APIs, the implementation of security measures can often be prone to error, misconfigured, or outdated from expected security guidelines. For instance, an API may have broken user authentication, broken object level authorization, broken function level authorization, excessive data exposure, or, generally, various security misconfigurations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for using Markov chains and hidden Markov Models to enhance API access controls for secure data. Software systems can use a set of Application Programming Interfaces (APIs) as an organized way to access stored data. In many implementations, developers of each API can be responsible for determining whether a client's request to access the stored data is valid. In development teams having many developers writing and managing these APIs, the implementation of security measures can often be prone to error, misconfigured, or outdated from expected security guidelines. For instance, an API may have broken user authentication, broken object level authorization, broken function level authorization, excessive data exposure, or, generally, various security misconfigurations. There are various industries, like healthcare and financial services, where these security concerns are critical problems due to the sensitive nature of the data stored.

To solve these problems, various embodiments disclosed in this application introduce an access control application between the APIs and a data store that uses Markov chains or hidden Markov models to validate, check, or verify that the data request meets expected security guidelines. These embodiments can enhance security for all requests for data. Additionally, these embodiments can serve as an additional, automated security defense when a developer misconfigures or fails to include the appropriate validation logic within an API.

In the following discussion, a general description of the systems and their components are provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
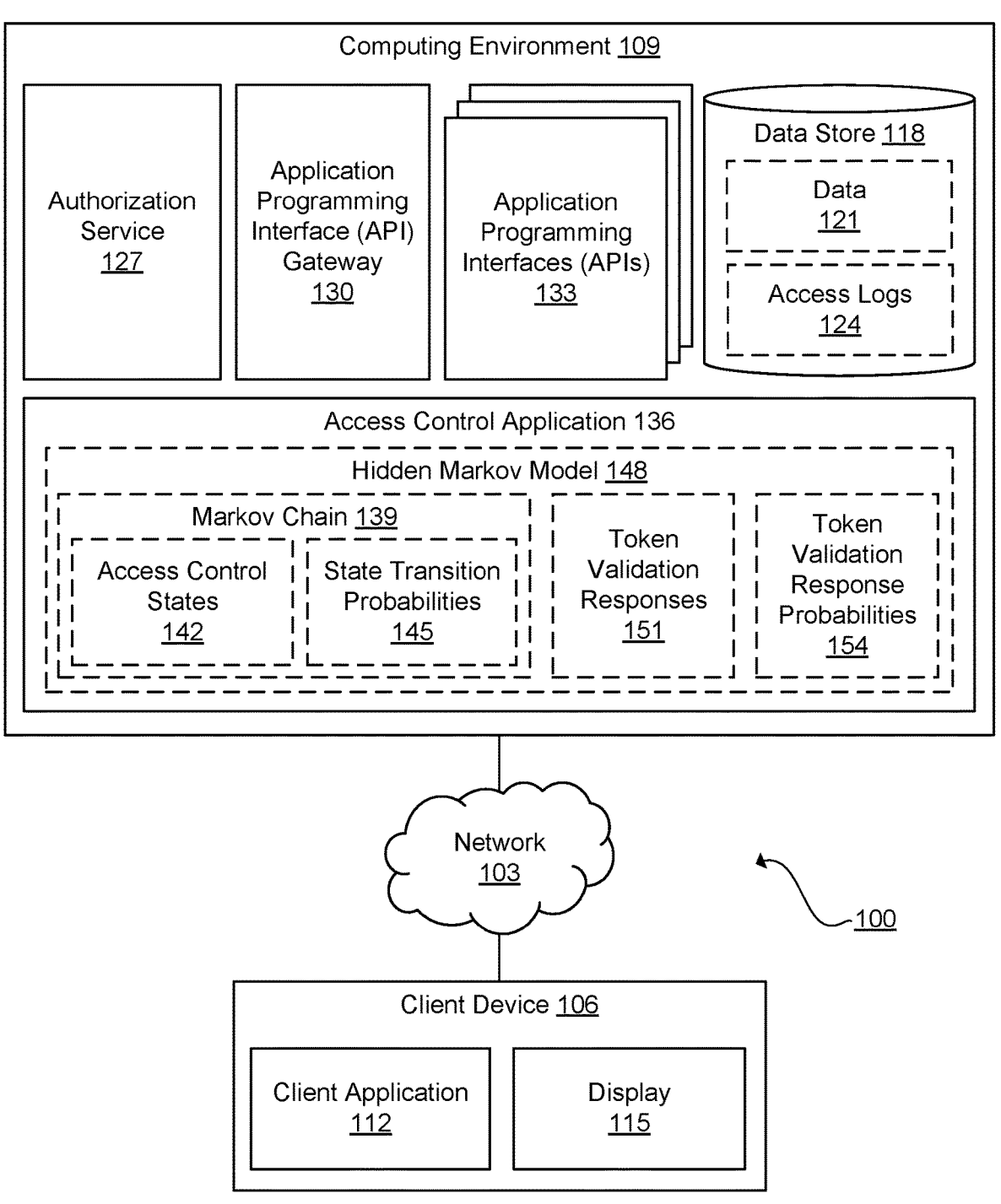
FIG. 1 is a drawing of a network environment according to various embodiments of the present disclosure.

With reference to FIG. 1, shown is a network environment 100 according to various embodiments. The network environment 100 can include various devices in data communication with each other via a network 103, such devices including a client device 106 and a computing environment 109.

The network 103 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 103 can also include a combination of two or more networks 103. Examples of networks 103 can include the Internet, intranets, extranets, virtual private networks (VPNs), and similar networks.

A client device 106 can represent one or more devices in connection with the computing environment 109 over the network 103. For example, the client device 106 can be a mobile phone, tablet, laptop, desktop, or other devices used by an end-user (e.g., a customer, a patient, a card holder, an account holder, etc.). In at least another example, the client device 106 can be a server connected over a Wide Area Network (WAN), wherein an institutional-user (e.g., a merchant, an affiliate, etc.) can communicate with the computing environment 109 using the client device 106. In at least another example, the client device 106 can be any computing device, wherein an administrative user can communicate with the computing environment 109 using the client device 106.

In at least one embodiment, the client device 106 can represent one or more computing devices that include a processor, a memory, and/or a network interface. For example, the client device 106 can be configured to perform computations on behalf of other computing devices or applications. As another example, such computing devices can host and/or provide content to other computing devices in response to requests for content. In such an embodiment, the client device 106 may represent an internal system that seeks information from the computing environment 109.

In another embodiment, the client device 106 can represent one or more of a plurality of client devices that can be coupled to the network 103. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 115 such as liquid crystal displays (LCDs), gas plasma-based flat panel displays, organic light emitting diode (OLED) displays, electrophoretic ink ("E-ink") displays, projectors, or other types of display devices. In some instances, the display 115 can be a component of the client device 106 or can be connected to the client device 106 through a wired or wireless connection.

The client device 106 can be configured to execute various applications, such as a client application 112 or other applications. The client application 112 can be executed in a client device 106 to access network content served up by the computing environment 109 or other servers, thereby rendering a user interface on the display 115. To this end, the client application 112 can include a browser, a dedicated application, or other executable, and the user interface can include a network page, an application screen, or other user mechanism for obtaining user input. The client device 106 can be configured to execute applications beyond the client application 112 such as email applications, social networking applications, word processors, spreadsheets, or other applications.

The computing environment 109 can include one or more computing devices that include a processor, a memory, and/or a network interface. For example, the computing environment 109 can be configured to perform computations on behalf of other computing devices or applications. As another example, such computing devices can host and/or provide content to other computing devices in response to requests for content.

The computing environment 109 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 109 can employ a plurality of computing devices that can be arranged in one or more server banks or computer banks or other arrangements. Such computing devices can be located in a single installation or can be distributed among many different geographical locations. For example, the computing environment 109 can include a plurality of computing devices that together can include a hosted computing resource, a grid computing resource, or any other distributed computing arrangement. In some cases, the computing environment 109 can correspond to an elastic computing resource where the allotted capacity of processing, network, storage, or other computing-related resources can vary over time.

Various data is stored in a data store 118 that is accessible to the computing environment 203. The data store 118 can be representative of a plurality of data stores 118, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 118 is associated with the operation of the various applications or functional entities described below. This data can include data 121, access logs 124, and potentially other data.

The data 121 can represent various types of data that a business or user wants to keep secure. Examples of data 121 can include personally identifying information such as an individual's name, age, birthday, height, weight, social security number, identification number, driver's license number, or other identifying information about the end user. The data 121 can also include password-related information the end user may want to keep private from others, such as password hints and password recovery answers.

In some embodiments, the data 121 can include cardholder data that is secured under Payment Card Industry Data Security Standard (PCI-DSS) compliance standards, such as a cardholder's name, an account number, and information about a specific card, such as a card identification number, an expiration date, and a security code. Further, the data 121 can include transaction data, such as a date of a transaction, the amount spent in the transaction, the paying entity, the entity that was paid, a brief description of the transaction, and/or any additional information related to the transaction. As another example, the data 121 can include secure communications between two or more entities. For instance, the data 121 can include secure messages between a payment card (credit, debit, charge, etc.) issuer and an end-user. In at least another embodiment, the data 121 can include patient data that is secured under Health Insurance Portability and Accountability Act (HIPAA) compliance standards, such as patient health records, patient identifying information, or any other information secured under HIPAA compliance standards.

In at least some embodiments, the data 121 can include reports, aggregated data, and/or summaries of the previously mentioned data. For instance, the data 121 can include a credit report based at least in part on the user's credit transaction information. In another example, the data 121 can include an aggregated list of unpaid balances, bounced payments, or outstanding payments. In at least another embodiment, the data 121 can include a summary of a patient's medication. Data 121 can include other data that a user may want to keep secured and the language used in this specification should not be limiting.

The access logs 124 can represent data collected by various applications of the computing environment 109 regarding access to data 121. For instance, the access logs 124 can include a history of communications between the computing environment 109 and one or more client devices 106. These communications of the access logs 124 could be demonstrated as a log of Transmission Control Protocol/Internet Protocol (TCP/IP) requests and responses or User Datagram Protocol (UDP) packets that were sent or received. In at least one embodiment, the communications of the access logs 124 can represent communications between a client device 106 and the computing environment 109 using a Representational State Transfer Application Programming Interface (REST API). In at least another embodiment, the communications of the access logs 124 can represent communications between a client device 106 and the computing environment 109 using a Simple Object Access Protocol (SOAP).

The access logs 124 can include various types of information, including one or more IP addresses, status codes, tokens, and various header parameters. Tokens can be generated and granted to client devices 106 by an authentication service 127. A client device 106 can send a token back to the computing environment 109 to make calls on an Application Programming Interface (API) gateway 130 or one or more APIs 133. The access logs 124 can include requests and responses between the client device 106 and any of the authorization service 127, API gateway 130, and APIs 133. In various embodiments, the tokens can be formatted as JSON Web Tokens (JWT) having a header, payload, and/or a signature. The JWT can include various header parameters, such as an algorithm and type of token. The JWT can include various payload parameters, such as an issuer ID, a user id, an encrypted secret, an expiration datetime, a list of scopes/APIs accessible with this token, an authentication ID, an authentication time, a token ID, a reason the token was issued, an issued-at-time, and a max idle time. The value corresponding to an expiration datetime can include a year, a numeric representation of a month (e.g., 1 or 01, 2 or 02, 11, 12, etc.), a string representation of a month (e.g., January, February, March, etc.), a numeric representation of a day of a month (e.g., 1 or 01, 10, 11, 20, 30, 31, etc.), a string representation of a day of the week (e.g., Monday, Tuesday, Wednesday, etc.), a numeric representation of a year (e.g., '22, 2022,), an numeric representation of an hour (e.g., 0 or 00, 1 or 01, 2 or 02, 12, 13, 23 etc.), a numeric representation of minutes in an hour (e.g., 0 or 00, 1 or 01, 59, etc.), a numeric representation of seconds (e.g., 0 or 00, 1 or 01, 59, etc.), a meridiem indicator (e.g., AM, PM, etc.) a time zone (e.g., +1, −1, EDT, EST, UTC+03:30, GMT −8:45, etc.), some numeric representation of a point in time since an epoch (e.g., 1649970255, which represents the total number of seconds from midnight GMT on Jan. 1, 1970 to Thursday, Apr. 14, 2022 5:04:15 PM GMT-04:00), or any combination thereof (e.g. Thursday, Apr. 14, 2022 5:04:15 PM GMT-04:00, 2022-04-14 17:04:15 EDT, etc.).

Also, various applications or other functionality can be executed in the computing environment 109. The components executed by the computing environment 109 include an authorization service 127, an API gateway 130, one or more APIs 133, an access control application 136, and other applications, services, processes, systems, engines, or functionality not discussed in detail herein.

The authorization service 127 can be executed to authorize, generate, and/or transmit tokens. The authorization service 127 can receive requests from one or more client applications 112 over the network 103 that want access to one or more APIs 133 on the computing environment 109. The authorization service 127 can generate a token in response to receiving any request having any required credentials. In many embodiments, the token can be formatted as a JSON Web Token (JWT) having a header, payload, and/or a signature. The JWT can include various header parameters, such as an algorithm and type of token. The JWT can include various payload parameters, such as an issuer ID, a user id, an encrypted secret, an expiration datetime, a list of scopes/APIs accessible with this token, an authentication ID, an authentication time, a token ID, a reason the token was issued, an issued-at-time, and a max idle time. After generating the token, the authorization service 127 can transmit the token to a client application 112 on a client device 106 over the network 103. Any request, response, and/or transmission between the client application 112 and the authorization service 127 over the network 103 can be secured using various cryptographic methods or secure communication protocols.

The API gateway 130 can be executed to receive, intercept, validate, and/or route communications between the client application 112 on the client device 106 with one or more of the APIs 133 on the computing environment 109. The API gateway 130 can receive a request from client application 112 over the network 100. In at least one embodiment, the API gateway 130 can receive a request that is intended to be received by the API gateway 130. In at least another embodiment, the API gateway 130 can intercept a request being sent to an API 133. In response to receiving the request, the API gateway 130 can introspect various properties of the request, including one or more IP addresses, status codes, tokens, or request header information. The API gateway 130 can determine which API 133 can handle the request based at least in part on the previously mentioned properties of the request. Additionally, the API gateway 130 can perform a simple validation on any of the data in the request. If the information is invalid, the API gateway 130 can send a response indicating the request was invalid to the client application 112. Alternatively, the API gateway 130 can route or otherwise send an invalid request to an API 133 for special handling or additional processing. If a request is determined to be valid or if no validation occurs, the API gateway 130 can route or otherwise send the request to one or more APIs 133 for additional processing.

The APIs 133 can be executed to perform a various number of tasks. Each API 133 can be configured to receive a request from the client application 112 over the network 100 or receive a request from the API gateway 130. In at least one embodiment, an API 133 can receive a request directly from client application 112 over the network 100. In at least another embodiment, an API 133 can receive a request being sent from the API gateway 130. In response to receiving the request, an API 133 can introspect various properties of the request, including one or more IP addresses, status codes, tokens, or request header information. The API 133 can validate any of the data in the request. If the information is invalid, the API 133 can send a response indicating the request was invalid to the client application 112. During its execution, the API 133 may want to access data 121 from the data store 118 to process or transmit in a response to the client application 112. To access the data 121, the API 133 can send a request to access a portion of the data 121 on the data store 118. To do so, the API 133 can directly send a request to the data store 118, which can be intercepted by the access control application 136. Alternatively, the API 133 can send a request directly to the access control application 136, which can provide access to the data store 118. The API 133 can receive a response from the access control application 136 or from the data store 118. The response from the data store 118 or the access control application 136 can contain data 121, a status code, or various other information. The API 133 can forward the response or transmit, over the network 103, a new response to the client application 112 on the client device 106. The API 133 can do other various tasks that are not listed here, including processing data, authorizing transactions, directing data to be stored in the data store 118, or other various actions. This disclosure is not intended to limit the scope of the type of actions that the API 133 can be executed to perform.

The access control application 136 can be executed to process or validate a token sent from the API 133 through a Markov chain 139. A Markov chain 139 is a mathematical system that represents transitions from one state to the next state in a probabilistic manner. Using a Markov chain 139, access control application 136 can provide predictions regarding a future state(s) of the processed data (e.g., a token) based solely on the present state. An example of a Markov chain 139 will be further discussed in FIG. 2. The process to generate a Markov chain 139 will be further discussed in FIG. 4. A Markov chain 139 can include an access control state 142 (also referred to collectively as "access control states 142" and generically as "an access control state 142") and a state transition probability 145 (also referred to collectively as "state transition probabilities 145" and generically as "a state transition probability 145").

An access control state 142 represents a state of a token. There can be various access control states 142 that represent the various possible states of the token. For example, there can be access control states 142 to represent an unauthenticated state, an authenticated state, an unauthorized state, an authorized state, and/or various error states. The state of a token can be defined by the token's format, attributes, and values. For example, a token can be described as being attributed to an unauthenticated state because the token lacks certain attributes that are expected for authenticated access. Similarly, a token can be described as being in an authenticated state because the token is formatted in a specified manner, contains any required attributes, and those attributes have valid values. An access control state 142 represents each of those token states in the Markov chain 139. Each access control state 142 can have validation rules that correspond to the required or non-required attributes for the access control state 142. Additionally, each access control state 142 can have an access determination value which indicates whether access to the data store 118 is granted. Generally, the access control states 142 can be shown in an ordered sequence and connected by state transition probabilities 145.

State transition probabilities 145 represent the probabilities that a token will transition between access control states 142. State transition probabilities 145 can be represented as an arrow having a weight in a weighted directed graph, wherein the weight represents the probability to transition from the first of the access control states 142 to the second of the access control states 142. Additionally, state transition probabilities 145 can also be represented as a matrix of weights where the rows represent a first access control state 142 and the columns represent a second access control state 142. Each value in the matrix can represent the probability to transition from the first access control state 142 to the second access control state. Additionally, there can be a state transition probability 145 between an access control state 142 and itself, creating a loop. The weight of the state transition probabilities 145 can be represented as a percentage or a decimal value. Additionally, the total sum of weights from state transition probabilities 145 leaving a specified access control state 142 could be summed to one-hundred percent or a decimal value of one. Further examples of access control states 142, state transition probabilities 145, and Markov chains 139 will be further discussed in FIG. 2.

In some implementations, a Markov chain 139 could be included in, or a component of, a hidden Markov model 148. In these implementations, the access control application 136 could be configured to use a hidden Markov model 148 instead of a Markov chain 139. The hidden Markov model 148 can also include token validation responses 151 and/or token validation response probabilities 154. A hidden Markov model 148 refers to a probability model wherein a specified output or a response can be estimated based at least in part on a provided input. A hidden Markov model 148 provides a way to estimate a specific outcome given an input, without processing the input through the Markov chain 139. In the present embodiment, the hidden Markov model 148 is applied to estimate a token validation response 151 corresponding to the access control states 142 when the token is given.

The token validation responses 151 can represent responses from the result of traversing a Markov Chain 139. Each token validation responses 151 can include a response code, status, or message to be delivered by the access control application 136. There can be one or more token validation responses 151 for a hidden Markov model 148. Further examples of token validation responses 151 are discussed in the description for FIG. 3.

The token validation response probabilities 154 represent the probabilities that a specified token will yield a specified token validation response 151. Token validation response probabilities 154 are typically represented as an arrow having a weight in a weighted directed graph, wherein the weight represents the probability to yield a token validation response 151 from a specified access control state 142. Additionally, token validation response probabilities 154 can also be represented as a matrix of weights where the rows represent an access control state 142 and the columns represent a token validation response 151. Each value in the matrix can represent the probability to yield a token validation response 151 from the access control state 142. The weight of the token validation response probabilities 154 can be represented as a percentage or a decimal value. In these implementations, the total sum of weights to a specified token validation response 151 could be summed to one-hundred percent or a decimal value of one. Further examples of token validation responses 151, token validation response probabilities 154, and hidden Markov models 148 will be further discussed in FIG. 3.

Next, a general description of the operation of the various components of the network environment 100 of FIG. 1 is provided for when the access control application 136 is configured to utilize a Markov chain 139. To begin, a client application 112 may want to obtain data, including data 121, from an API 133. To do so, the client application 112 can send a request to the authorization service 127 running in the computing environment 109. The authorization service 127 can return a token to the client application 112 for use by the APIs 133. The client application 112 can send a request, including the token, to an API gateway 130 or directly to a specified API 133 to obtain the data. The API gateway 130 can implement various validation steps to ensure the request is valid before transmitting the request to an API 133. The API 133 can also implement various validation steps to ensure the request is valid before transmitting a request to obtain data 121 to an access control application 136. The request can be intercepted by or otherwise routed through the access control application 136 for processing before the request can reach the data store 118. If the access control application 136 determines that the token is valid, the request can be routed to the data store 118, which can return the data 121 to the API 133. If the token is invalid, the access control application 136 may return a response to the API 133 indicating that the token is invalid. The API 133 can send a response to the client application 112 indicating the result of the provided from the access control application 136.

At least another operation of the various components of the network environment 100 is demonstrated in FIG. 4, but briefly described below. The network environment 100 can be operated to generate a Markov chain 139. The access control application 136 can obtain or retrieve the access logs 124 from the data store 118. Based at least in part on the data in the access logs 124, the access control application 136 can identify one or more access control states 142. Next, the access control application 136 can determine a pattern to order the one or more access control states 142. Next, the access control application 136 can determine state transition probabilities 145 between the one or more ordered access control states 142, which completes a Markov chain 139. The Markov chain 139 can then be stored with the access control application 136.

Next, a general description of the operation of the various components of the network environment 100 of FIG. 1 is provided for when the access control application 136 is configured to utilize a hidden Markov model 148. To begin, a client application 112 can request to obtain data, including data 121, from an API 133. To do so, the client application 112 can send a request to the authorization service 127 running in the computing environment 109. The authorization service 127 can return a token to the client application 112 for use by the APIs 133. The client application 112 can send a request, including the token, to an API gateway 130 or directly to a specified API 133 to obtain the data. The API gateway 130 can implement various validation steps to ensure the request is valid before transmitting the request to an API 133. The API 133 can also implement various validation steps to ensure the request is valid before transmitting a request to obtain data 121 to an access control application 136. The request can be intercepted by or otherwise routed through the access control application 136 for processing before the request can reach the data store 118. If the access control application 136 determines that the token is valid, the request can be routed to the data store 118, which can return the data 121 to the API 133. If the token is invalid, the access control application 136 may return a response to the API 133 indicating that the token is invalid. The API 133 can send a response to the client application 112 indicating the result of the provided from the access control application 136.

At least another operation of the various components of the network environment 100 of FIG. 1 is demonstrated in FIG. 5, but briefly described below. The network environment 100 can be operated to generate a hidden Markov model 148. The access control application 136 can obtain or retrieve the access logs 124 from the data store 118. Based at least in part on the data in the access logs 124, the access control application 136 can identify one or more access control states 142. Next, the access control application 136 can determine a pattern to order the one or more access control states 142. Next, the access control application 136 can determine state transition probabilities 145 between the one or more ordered access control states 142, which completes a Markov chain 139. Next, the access control application 136 can identify one or more token validation responses 151. Next, the access control application 136 can determine token validation response probabilities 154 between the one or more ordered access control states 142 and the token validation responses 151, which completes the hidden Markov model 148. The hidden Markov model 148 can then be stored with the access control application 136.

Figure 2:
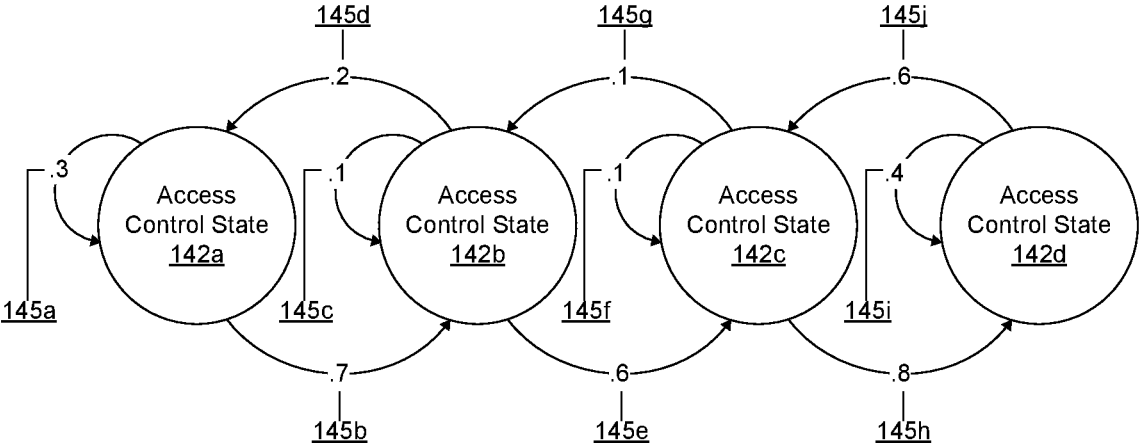
FIG. 2 is a drawing of an example Markov chain according to various embodiments of the present disclosure.

Referring next to FIG. 2, shown is an example of a Markov chain 139 as previously described in FIG. 1. FIG. 2 demonstrates a plurality of access control states 142a-d and a plurality of state transition probabilities 145a-j connecting the plurality of the access control states 142a-d. Each of the state transition probabilities 145a-j has a weight that is represented by a decimal value. Additionally, each of the state transition probabilities 145a-j provides a direction, as demonstrated by the arrows. For instance, state transition probability 145a represents a thirty percent chance or "0.3" decimal value chance to transition from access control state 142a back to access control state 142a. Also, state transition probability 145b represents a seventy percent chance or "0.7" decimal value chance to transition from access control state 142a to access control state 142b. The sum of state transition probabilities 145 departing from access control state 142a yield one-hundred percent or decimal value one, because the "0.3" of state transition probability 145a and the "0.7" of state transition probability 145b can be summed to "1.0".

In one example of the Markov chain 139 shown in FIG. 2, the access control state 142a can represent an "unauthenticated" state, access control state 142b can represent an "authenticated" state, access control state 142c can represent an "unauthorized" state, and access control state 142d can represent an "authorized" state. A token can be compared to the various access control states 142a-d to determine a token's current state. In an example, the access control application 136 can determine that the received token is in an "unauthenticated" state, which is access control state 142a. There is a seventy percent likelihood that the token will transition into an "authenticated" state, which is access control state 142b. Based at least in part on that prediction, the access control application 136 can determine whether to grant access to the data 121 in the data store 118.

Figure 3:
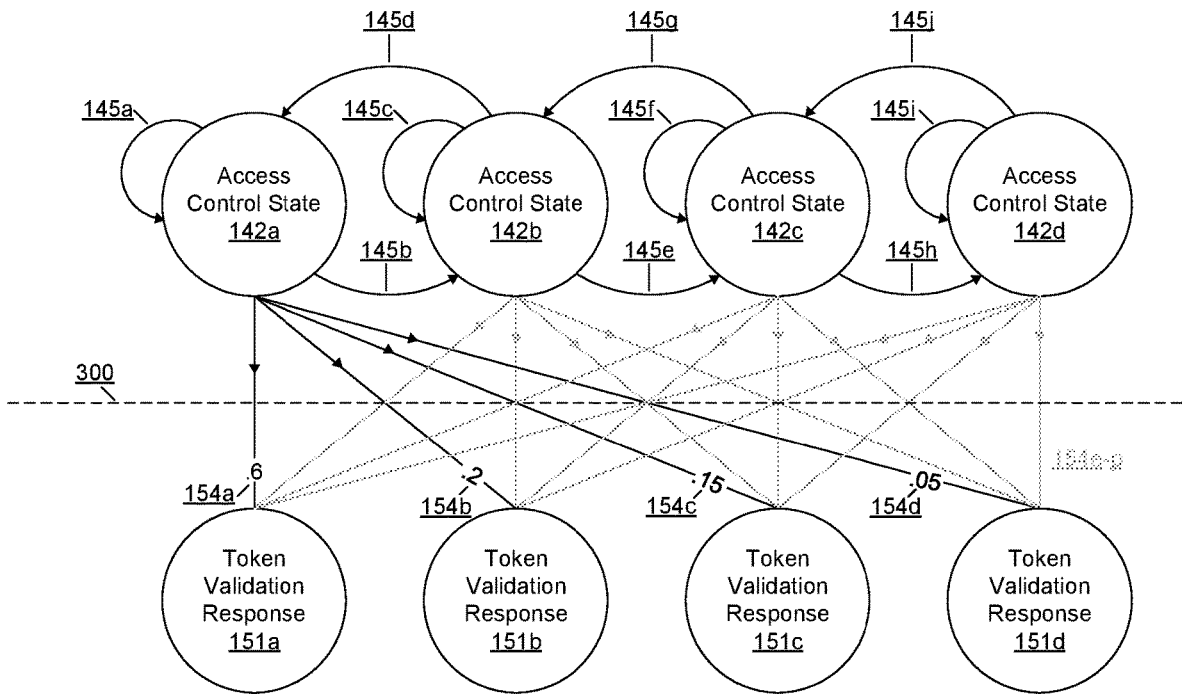
FIG. 3 is a drawing of an example hidden Markov model according to various embodiments of the present disclosure.

Turning now to FIG. 3, shown is an example of a hidden Markov model 148 as previously described in FIG. 1. FIG. 3 demonstrates a plurality of access control states 142a-d, connected by and a plurality of state transition probabilities 145a-j. Although it is not shown in FIG. 3, each of the state transition probabilities 145a-j can have a weight that is represented by a percentage value or a decimal value similar to that shown in FIG. 2. Additionally, each of the state transition probabilities 145a-j provide a direction, as demonstrated by the arrows. For instance, state transition probability 145a represents a chance to transition from access control state 142a back to access control state 142a. In another example, state transition probability 145b represents a chance to transition from access control state 142a to access control state 142b. The sum of state transition probabilities' 145 weights departing from access control state 142a yield one-hundred percent or decimal value one, although the weights are not explicitly shown in FIG. 3.

Additionally, a hidden Markov model 148 can have one or more token validation responses 151a-d. Token validation responses 151a-d have been previously described in the discussion for FIG. 1. The token validation responses 151a-d can be connected to the access control states 142a-d by token validation response probabilities 154a-p. Due to the limited space in depicting a complex graph such as a hidden Markov Model 148, FIG. 3 provides a representative example of the token validation response probabilities 154 as having a weight and direction with token validation response probabilities 154*a-d*; Token validation response probabilities 154*e-p* (depicted in gray) can also include weights and direction. The token validation response probabilities 154*a-d* connect the access control state 142*a* to token validation responses 151*a-d*. The weights of the token validation response probabilities 154*a-d* could be summed to one-hundred percent or decimal value one. The weights of the token validation response probabilities 154*a-d* represent likelihood that, given an input that would match the access control state 142*a*, the token validation response 151*a* would be the correct result.

FIG. 3 also depicts a separation line 300, which separates the Markov chain 139 from the token validation responses 151*a-d*. This separation line 300 demonstrates the possibility that the Markov chain 139 of the hidden Markov model 148 can be inaccessible for real time processing of a token, so the only values the access control application 136 can access are the token validation responses 151*a-d* and the token validation response probabilities 154*a-p*. Using that information, the access control application 136 can predict a token validation response 151*a-d* based at least in part on a perceived state of a token and the token validation response probabilities 154*a-p*.

In various examples of the Markov chain 139 shown in FIG. 2, the access control state 142*a* can represent an "unauthenticated" state. In various examples, the access control state 142*b* can represent an "authenticated" state. In various examples, the access control state 142*c* can represent an "unauthorized" state. In various examples, the access control state 142*d* can represent an "authorized" state. In at least one example, the token validation response 151*a* can represent a "failure" response having a "400" status code. In at least one example, the token validation response 151*b* can also represent a "success" response having a "204" status code. In at least one example, the token validation response 151*c* can represent a "failure" response having a "401" status code. In at least one example, the token validation response 151*d* can represent a "success" response having a "200" status code.

The access control application 136 can provide a token to the hidden Markov model 148, which can determine a possible state of the token, like an access control state 142, and determine the most likely token validation response 151 based at least in part on the weights of the token validation response probabilities 154. Based at least in part on that prediction, the access control application 136 can determine whether to grant access to the data 121 in the data store 118.

Figure 4:
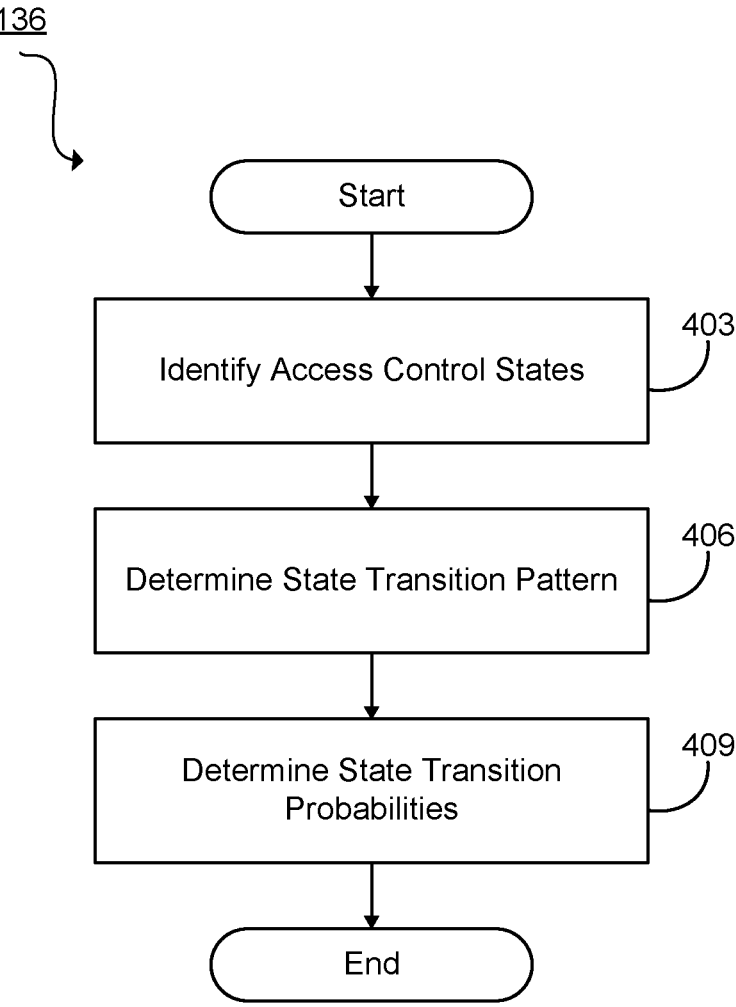
FIG. 4 is a flowchart illustrating one example of functionality implemented as portions of an application executed in a computing environment in the network environment of FIG. 1 according to various embodiments of the present disclosure.

Moving on to FIG. 4, shown is a flowchart that provides one example of the operation of a portion of the access control application 136. The flowchart of FIG. 4 provides merely an example of the many different types of functional arrangements that can be employed to implement the operation of the depicted portion of the access control application 136. As an alternative, the flowchart of FIG. 4 can be viewed as depicting an example of elements of a method implemented within the network environment 100. The following discussion of FIG. 4 focuses on performing a method of generating a Markov chain 139 by the access control application 136.

Beginning with block 403, the access control application 136 can identify access control states 142. To do so, the access control application 136 can first retrieve the access logs 124 from the data store 118. Once the access control application 136 has received a significant sample size of data within access logs 124, the access control application 136 can analyze the network traffic to see if network data patterns emerge. For example, when the various APIs 133 accessed data 121, the token could have been formatted in a specific manner, certain attributes of the token could have been present, or certain attributes of the token could have been omitted. These network data patterns can then be selected by the access control application 136 or an administrative user as being a significant state for which an access control state 142 should be made. The access control application 136 or the administrative user can identify two or more access control states 142 based at least in part on these network data patterns.

Next at block 406, the access control application 136 can determine a state transition pattern for the access control states 142. To determine a state transition pattern, the access control application 136 can determine an optimal order to place the access control states 142. The optimal order can be determined by analyzing various requests using specific a token that exists in the identified access control states 142. For example, a specific token can start in an "unauthenticated" access control state 142 and transition to an "authenticated" access control state 142. Subsequently, the token can transition from the "authenticated" access control state 142 to an "unauthorized" access control state 142. After analyzing a plurality of tokens that transitioned between the various access control states 142, the access control application 136 can determine the optimal order, or the state transition pattern, for the access control states 142.

Finally, at block 409, the access control application 136 can determine state transition probabilities 145 between the access control states 142. The state transition probabilities 145 can be determined by analyzing the access logs 124 to determine a proportion from the frequency transition of a first access control state 142 to a second access control state to the total transitions from a first access control state 142. This value will become the weight of the state transition probability 145 directed from a first access control state 142 to a second access control state 142. Additionally, the total sum of weights from state transition probabilities 145 leaving a specified access control state 142 could be summed to one-hundred percent or a decimal value of one. Once the state transition probabilities 145 have been calculated, then a Markov chain 139 has been created. The Markov chain 139, including its access control states 142 and state transition probabilities 145, can be stored in the access control application 136, thus ending the method of FIG. 4.

Figure 5:
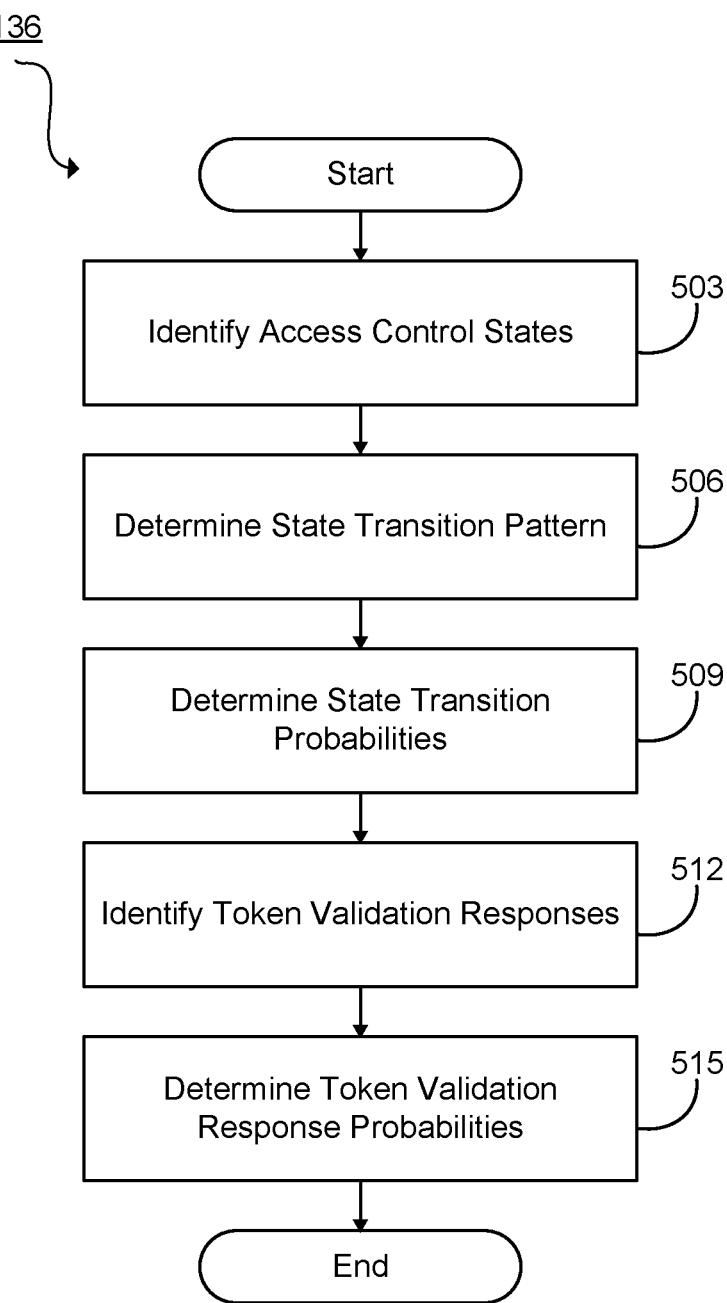
FIG. 5 is a flowchart illustrating one example of functionality implemented as portions of an application executed in a computing environment in the network environment of FIG. 1 according to various embodiments of the present disclosure.

Moving on to FIG. 5, shown is a flowchart that provides one example of the operation of a portion of the access control application 136. The flowchart of FIG. 5 provides merely an example of the many different types of functional arrangements that can be employed to implement the operation of the depicted portion of the access control application 136. As an alternative, the flowchart of FIG. 5 can be viewed as depicting an example of elements of a method implemented within the network environment 100. The following discussion of FIG. 5 focuses on performing a method of generating a hidden Markov model 148 by the access control application 136.

Beginning with block 503, the access control application 136 can identify access control states 142. To do so, the access control application 136 can first retrieve the access logs 124 from the data store 118. Once the access control application 136 has received a significant sample size of data within access logs 124, the access control application 136 can analyze the network traffic to see if network data patterns emerge. For example, when the various APIs 133 accessed data 121, the token could have been formatted in a specific manner, certain attributes of the token could have been present, or certain attributes of the token could have been omitted. These network data patterns can then be selected by the access control application 136 or an administrative user as being a significant state for which an access control state 142 should be made. The access control application 136 or the administrative user can identify two or more access control states 142 based at least in part on these network data patterns.

At block 506, the access control application 136 can determine a state transition pattern for the access control states 142. To determine a state transition pattern, the access control application 136 can determine an optimal order to place the access control states 142. The optimal order can be determined by analyzing various requests using specific a token that exists in the identified access control states 142. For example, a specific token can start in an "unauthenticated" access control state 142 and transition to an "authenticated" access control state 142. Subsequently, the token can transition from the "authenticated" access control state 142 to an "unauthorized" access control state 142. After analyzing a plurality of tokens that transitioned between the various access control states 142, the access control application 136 can determine the optimal order, or the state transition pattern, for the access control states 142.

At block 509, the access control application 136 can determine state transition probabilities 145 between the access control states 142. The state transition probabilities 145 can be determined by analyzing the access logs 124 to determine a proportion from the frequency transition of a first access control state 142 to a second access control state to the total transitions from a first access control state 142. This value will become the weight of the state transition probability 145 directed from a first access control state 142 to a second access control state 142. Additionally, the total sum of weights from state transition probabilities 145 leaving a specified access control state 142 could be summed to one-hundred percent or a decimal value of one. Once the state transition probabilities 145 have been calculated, then a Markov chain 139 has been created. The Markov chain 139, including its access control states 142 and state transition probabilities 145, can be stored in the access control application 136.

At block 512, the access control application 136 can identify token validation responses 151. The access control application 136 can analyze the specified responses to the network traffic to see if any network response data patterns emerge. For example, when the various APIs 133 accessed data 121 previously, the token could have been formatted in a specific manner, certain attributes of the token could have been present, or certain attributes of the token may have been omitted. The APIs 133 could have sent one or more different types of responses, like a success response of a failure response. These responses can include status codes or messages. These network response data patterns can then be selected by the access control application 136 or an administrative user as being a significant response for which a token validation response 151 should be made. The access control application 136 or the administrative user can identify two or more token validation response 151 based at least in part on these network response data patterns.

At block 515, the access control application 136 can determine token validation response probabilities 154 between the access control states 142 and the token validation responses 151. The token validation response probabilities 154 can be determined by applying various algorithms to the Markov chain 139. For example, the token validation response probabilities 154 can be calculated by passing the Markov chain 139 through at least one of the Baum-Welch training algorithm and the Viterbi training algorithm. Additionally, the total sum of weights from token validation response probabilities 154 leaving a specified access control state 142 could be summed to one-hundred percent or a decimal value of one. Once the token validation response probabilities 154 have been calculated, then a hidden Markov model 148 has been created. The hidden Markov model 148, including its Markov chain 139, its token validation responses 151, and token validation response probabilities 154, can be stored in the access control application 136, thus ending the method of FIG. 5.

Figure 6:
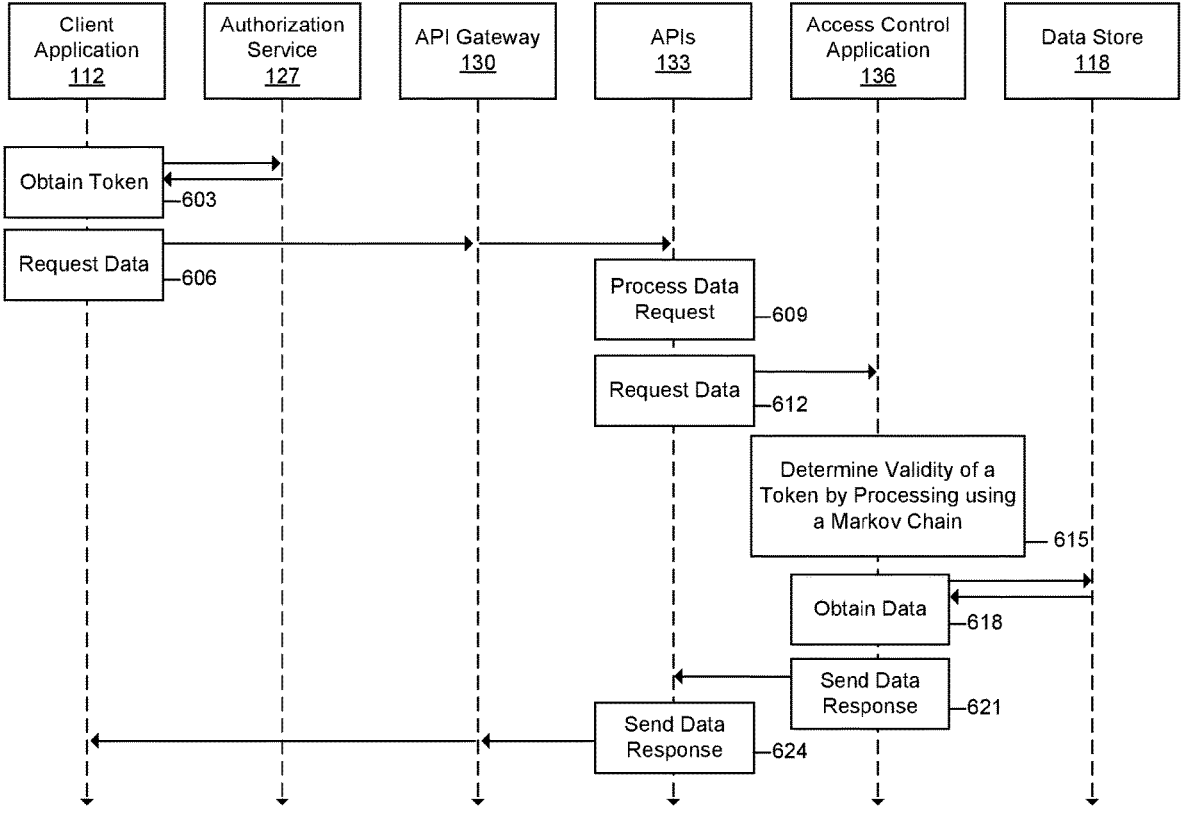
FIG. 6 is a sequence diagram illustrating one example of functionality implemented as in the network environment of FIG. 1 according to various embodiments of the present disclosure.

Moving on to FIG. 6, shown is a sequence diagram that provides one example of the interactions between the client application 112, the authorization service 127, the API gateway 130, the APIs 133, the access control application 136, and the data store 118. The sequence diagram of FIG. 6 provides merely an example of the many different types of functional arrangements that can be employed by the client application 112, the authorization service 127, the API gateway 130, the APIs 133, the access control application 136, and the data store 118. As an alternative, the sequence diagram of FIG. 6 can be viewed as depicting an example of elements of a method implemented within the network environment 100.

Beginning with block 603, the client application 112 can obtain a token from the authorization service 127. To do so, the client application 112 can open a secure connection with the authorization service 127. In some embodiments, the client application 112 can send authorization credentials, such as a username, a password, and/or a key, to the authorization service 127. Upon validating the authorization credentials, the authorization service 127 can send a response to the client application 112 containing a token. In various embodiments, the tokens can be formatted as JSON Web Tokens (JWT) having a header, payload, and/or a signature. The JWT can include various header parameters, such as an algorithm and type of token. The JWT can include various payload parameters, such as an issuer ID, a user id, an encrypted secret, an expiration datetime, a list of scopes/ APIs accessible with this token, an authentication ID, an authentication time, a token ID, a reason the token was issued, an issued-at-time, and a max idle time.

At block 606, the client application 112 can request data from the API gateway 130, which is routed to at least one of the many APIs 133. To do so, the client application 112 can send the token and various other request information to an API gateway 130, which can route the request to one or more APIs 113. Alternatively, the client application 112 can directly send the token and various other request information to an API 133.

At block 609, the APIs 133 can process the data request. For instance, the APIs 133 can perform validation to ensure the request was correctly made to the correct API 133. Additionally, the APIs 133 can validate the token before requesting data 121 from the access control application 136 to prevent an excess use of computing resources.

At block 612, the APIs 133 can request data 121 from the access control application 136. In one embodiment, an API 133 can send a request to obtain data 121 directly to an access control application 136. The request to obtain data 121 can include the token sent from the client application 112. In another embodiment, an API 133 can send a request to obtain data 121 to the data store 118, but the access control application 136 intercepts such a request. The request would also include the token sent from the client application 112.

At block 615, the access control application 136 can determine the validity of a token by processing the token through a Markov Chain 139. The access control application 136 can process the token through a Markov chain 139 to determine whether the token is valid for the purpose of accessing the data 121. In at least one example, the access control application 136 can receive a token comprising one or more attributes. The access control application 136 can identify a plurality of access control states 142 that the token can be situated, wherein each access control state 142 of the plurality of access control states 142 includes a validation rule and an access determination. The access control application 136 can determine, based at least in part on the one or more attributes of the token, a first access control state 142 from the plurality of access control states 142. The access control application 136 can identify the state transition probabilities 145 between the first access control state 142 and the plurality of access control states 142. The access control application 136 can choose a second access control state 142 from the plurality of access control states 142 based at least in part on values from the state transition probabilities 145. The access control application 136 can then validate the token against the validation rule of the second access state control state 142. Finally, the access control application 136 can send a response comprising the access determination of the second state if the token is valid. Although this example was between a first access control state 142 and second access control state 142, this method could be repeated between a second access control state 142 and a third access control state 142, and so on for the total number of access control states 142. This process of block 615 is discussed in further detail in FIG. 8.

At block 618, in response to determining the token is valid, the access control application 136 can obtain the data 121 from the data store 118. The access control application 136 can request data 121 from the data store 118. The data store 118 can respond to the request with the data 121. If the access control application 136 determines that the token is invalid to access the data 121 then the access control application 136 can skip block 618 and avoid accessing the data 121.

At block 621, the access control application 136 can send the data 121 to the requesting API 133. The access control application 136 can send a response to the requesting API 133 including an access determination, a status code, or a message. If the access control application 136 obtained the data 121, as described in block 618, the response to the requesting API 133 can include the data 121. However, if the data 121 was not obtained, the access control application 136 can send the response without the data 121.

At block 624, the API 133 can send a response to the client application 112. The API 133 can send a response to the client application 112 including any information processed in block 609, a status code, and/or a message. If the API 133 obtained the data 121, as described in block 621, the response to the client application 112 can include the data 121. However, if the data 121 was not obtained, the API 133 can send the response without the data 121. This ends the sequence diagram of FIG. 6.

Figure 7:
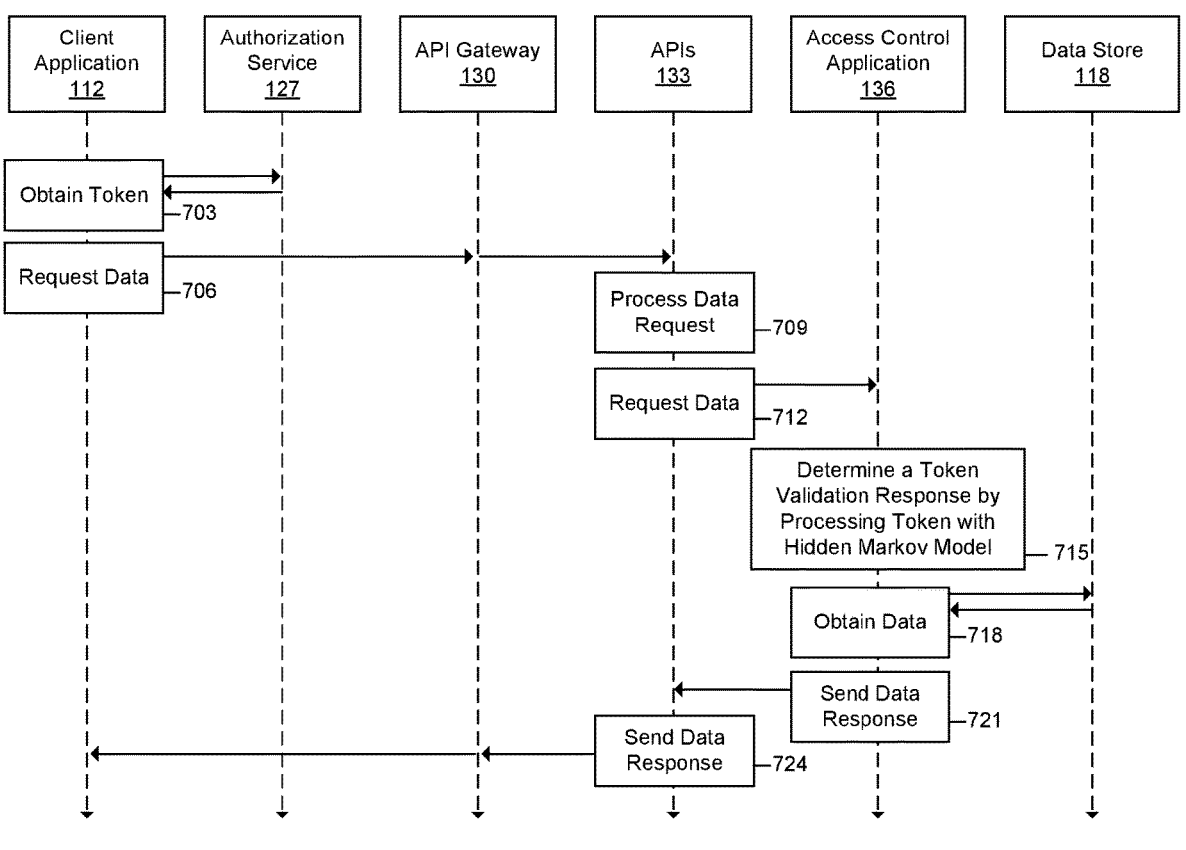
FIG. 7 is a sequence diagram illustrating one example of functionality implemented as in the network environment of FIG. 1 according to various embodiments of the present disclosure.

Moving on to FIG. 7, shown is a sequence diagram that provides one example of the interactions between the client application 112, the authorization service 127, the API gateway 130, the APIs 133, the access control application 136, and the data store 118. The sequence diagram of FIG.

7 provides merely an example of the many different types of functional arrangements that can be employed by the client application 112, the authorization service 127, the API gateway 130, the APIs 133, the access control application 136, and the data store 118. As an alternative, the sequence diagram of FIG. 7 can be viewed as depicting an example of elements of a method implemented within the network environment 100.

Beginning with block 703, the client application 112 can obtain a token from the authorization service 127. To do so, the client application 112 can open a secure connection with the authorization service 127. In some embodiments, the client application 112 can send authorization credentials, such as a username, a password, and/or a key, to the authorization service 127. Upon validating the authorization credentials, the authorization service 127 can send a response to the client application 112 containing a token. In various embodiments, the tokens can be formatted as JSON Web Tokens (JWT) having a header, payload, and/or a signature. The JWT can include various header parameters, such as an algorithm and type of token. The JWT can include various payload parameters, such as an issuer ID, a user id, an encrypted secret, an expiration datetime, a list of scopes/APIs accessible with this token, an authentication ID, an authentication time, a token ID, a reason the token was issued, an issued-at-time, and a max idle time.

At block 706, the client application 112 can request data from the API gateway 130, which is routed to at least one of the many APIs 133. To do so, the client application 112 can send the token and various other request information to an API gateway 130, which can route the request to one or more APIs 113. Alternatively, the client application 112 can directly send the token and various other request information to an API 133.

At block 709, the APIs 133 can process the data request. For instance, the APIs 133 can perform validation to ensure the request was correctly made to the correct API 133. Additionally, the APIs 133 can validate the token before requesting data 121 from the access control application 136 to prevent an excess use of computing resources.

At block 712, the APIs 133 can request data 121 from the access control application 136. In one embodiment, an API 133 can send a request to obtain data 121 directly to an access control application 136. The request to obtain data 121 can include the token sent from the client application 112. In another embodiment, an API 133 can send a request to obtain data 121 to the data store 118, but the access control application 136 intercepts such a request. The request would also include the token sent from the client application 112.

At block 715, the access control application 136 can determine the validity of a token by processing the token through a hidden Markov model 148. To following is a brief example of the method that may occur in determining the validity of a token by processing the token through a hidden Markov model 148. The access control application 136 can receive a token. Next, the access control application 136 can identify the token validation response probabilities 154 of a hidden Markov Model 148. The access control application 136 can determine a token validation response 151. Using the token validation response 151, the validity can be determined. This process of block 715 is discussed in further detail in FIG. 9.

At block 718, in response to determining the token is valid, the access control application 136 can obtain the data 121 from the data store 118. The access control application 136 can request data 121 from the data store 118. The data store 118 can respond to the request with the data 121. If the access control application 136 determines that the token is invalid to access the data 121 then the access control application 136 can skip block 718 and avoid accessing the data 121.

At block 721, the access control application 136 can send the data 121 to the requesting API 133. The access control application 136 can send a response to the requesting API 133 including an access determination, a status code, or a message. If the access control application 136 obtained the data 121, as described in block 718, the response to the requesting API 133 can include the data 121. However, if the data 121 was not obtained, the access control application 136 can send the response without the data 121.

At block 724, the API 133 can send a response to the client application 112. The API 133 can send a response to the client application 112 including any information processed in block 709, a status code, and/or a message. If the API 133 obtained the data 121, as described in block 721, the response to the client application 112 can include the data 121. However, if the data 121 was not obtained, the API 133 can send the response without the data 121. This ends the sequence diagram of FIG. 7.

Figure 8:
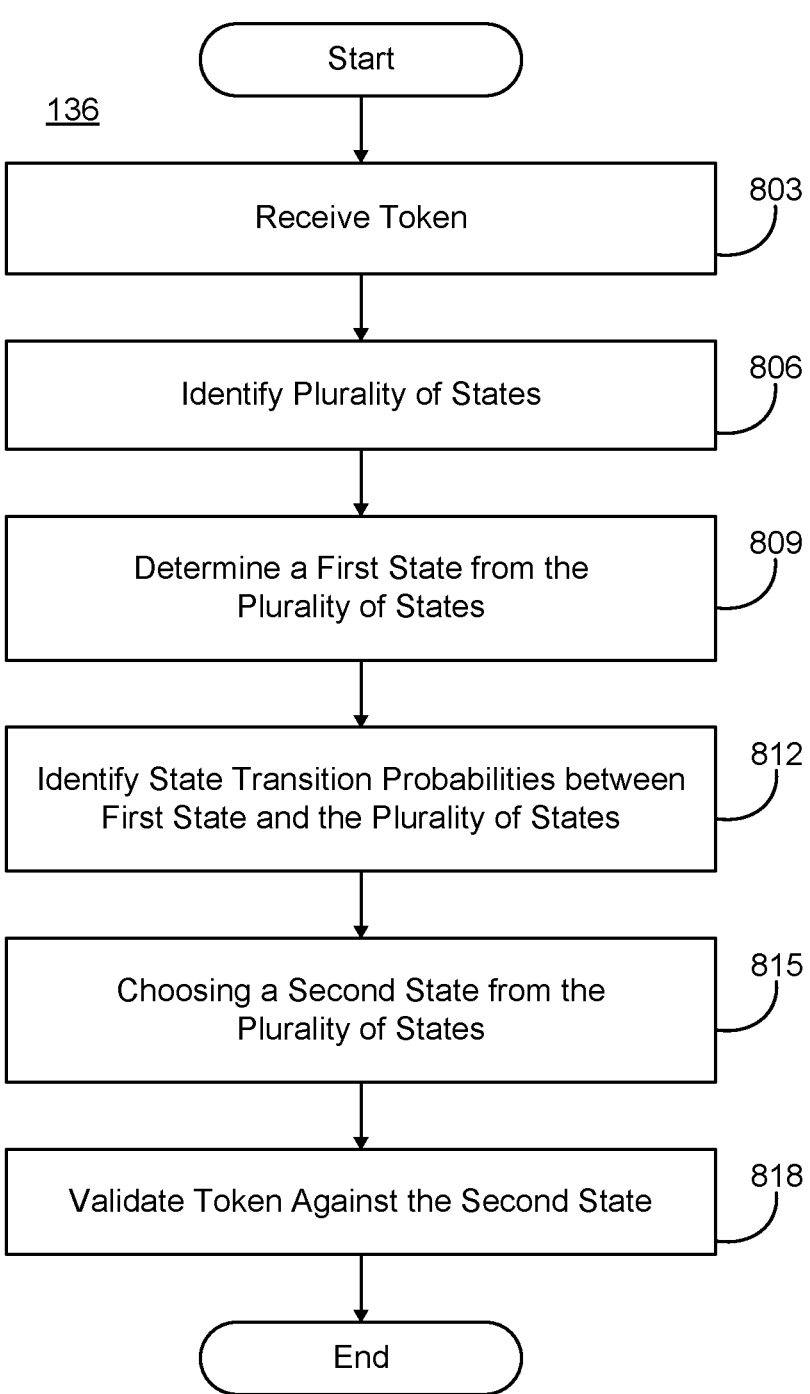
FIG. 8 is a flowchart illustrating one example of functionality implemented as portions of an application executed on application control application in the computing environment of FIG. 1 according to various embodiments of the present disclosure.

Moving on to FIG. 8, shown is a flowchart that provides one example of the operation of a portion of the access control application 136. The flowchart of FIG. 8 provides merely an example of the many different types of functional arrangements that can be employed to implement the operation of the depicted portion of the access control application 136. As an alternative, the flowchart of FIG. 8 can be viewed as depicting an example of elements of a method implemented within the network environment 100. The following discussion of FIG. 8 focuses on performing a method of validating a token with a Markov chain 139 on the access control application 136.

Beginning with block 803, the access control application 136 can receive a token. In at least one example, the access control application 136 can receive a token comprising one or more attributes. In various embodiments, the tokens can be formatted as JSON Web Tokens (JWT) having a header, payload, and/or a signature. The JWT can include various header parameters, such as an algorithm and type of token. The JWT can include various payload parameters, such as an issuer ID, a user id, an encrypted secret, an expiration datetime, a list of scopes/APIs accessible with this token, an authentication ID, an authentication time, a token ID, a reason the token was issued, an issued-at-time, and a max idle time.

At block 806, the access control application 136 can identify a plurality of access control states 142 of a Markov chain 139. The access control application 136 can identify a plurality of access control states 142 that the token can be situated, wherein each access control state 142 of the plurality of access control states 142 includes a validation rule and an access determination.

At block 809, the access control application 136 can determine a first access control state 142 from the plurality of access control states 142. In at least one embodiment, the access control application 136 can make this determination based at least in part on at least one or more attributes of the token. For example, the access control application 136 can introspect the token to determine that it has an expiration datetime set to a date/time that has already passed. In this situation, the access control application 136 can determine that an access control state 142 is in an "unauthenticated" state or an "expired" state.

At block 812, the access control application 136 can identify the state transition probabilities 145 between the first access control state 142 and the plurality of access control states 142. To do so, the access control application 136 can identify any state transition probability 145 that represents a transition from the first access control state 142. In doing so, the access control application 136 will further identify any subsequent access control states 142 to which the token can transition.

At block 815, the access control application 136 can choose a second access control state 142 from the plurality of access control states 142. The access control application 136 can choose the second access control state 142 based at least in part on the weight values from the identified state transition probabilities 145. In at least one embodiment, the access control application 136 can choose the access control state 142 corresponding to the greatest weight value of the identified state transition probabilities 145. In another embodiment, the second access control state 142 can be chosen based at least in part on properties of the second access control state 142, such as the validation rule or the access determination.

At block 818, the access control application 136 can validate the token against the second access control state 142. Specifically, the access control application 136 can validate the token against the validation rules of the second access control state 142. For instance, a validation rule may require that an attribute or parameter of the token be present, formatted a certain way, or be omitted. Finally, the access control application 136 can send a response comprising the access determination of the second state if the token is valid. After sending a response, the flowchart of FIG. 8 is complete.

Figure 9:
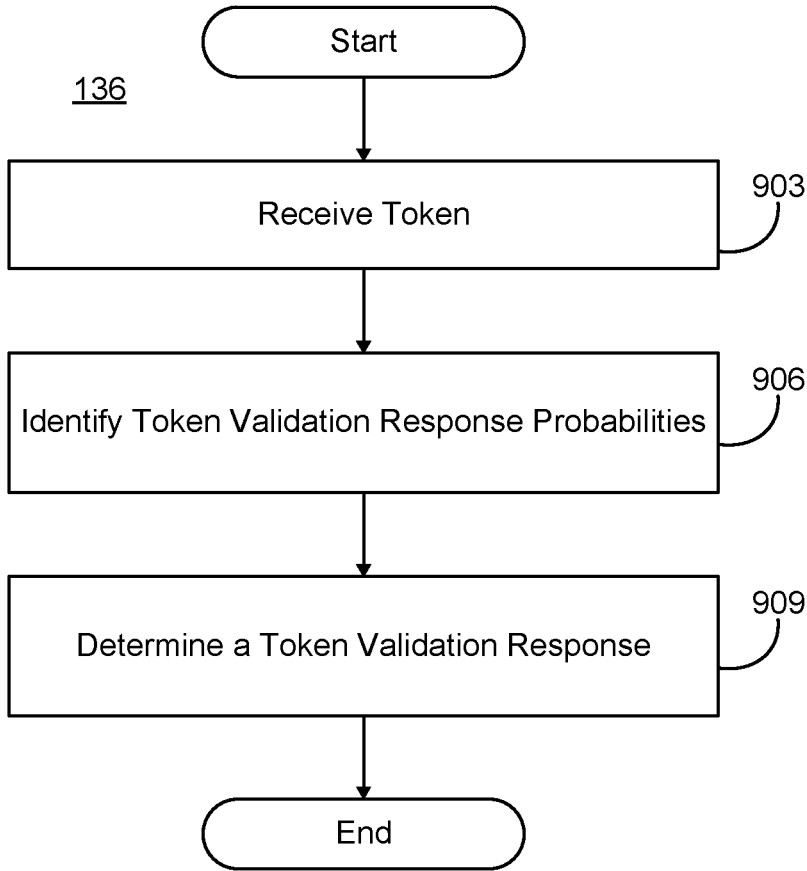
FIG. 9 is a flowchart illustrating one example of functionality implemented as portions of an application executed on application control application in the computing environment of FIG. 1 according to various embodiments of the present disclosure.

Moving on to FIG. 9, shown is a flowchart that provides one example of the operation of a portion of the access control application 136. The flowchart of FIG. 9 provides merely an example of the many different types of functional arrangements that can be employed to implement the operation of the depicted portion of the access control application 136. As an alternative, the flowchart of FIG. 9 can be viewed as depicting an example of elements of a method implemented within the network environment 100. The following discussion of FIG. 9 focuses on performing a method of validating a token with a hidden Markov model 148 on the access control application 136.

Beginning with block 903, the access control application 136 can receive a token. In various embodiments, the tokens can be formatted as JSON Web Tokens (JWT) having a header, payload, and/or a signature. The JWT can include various header parameters, such as an algorithm and type of token. The JWT can include various payload parameters, such as an issuer ID, a user id, an encrypted secret, an expiration datetime, a list of scopes/APIs accessible with this token, an authentication ID, an authentication time, a token ID, a reason the token was issued, an issued-at-time, and a max idle time.

At block 906, the access control application 136 can identify the token validation response probabilities 154 of a hidden Markov Model 148. The hidden Markov model 148 may be inaccessible for real-time processing of a token, so the only values the access control application 136 can access may be the token validation responses 151*a-d* and the token validation response probabilities 154*a-p*. To identify the relevant token validation response probabilities 154, the access control application 136 can determine a likely access control state 142 of the token and choose the token validation response probabilities 154 based at least in part on their connection to that access control state 142.

At block 909, the access control application 136 can determine a token validation response 151. Using the identified token validation response probabilities 154 of block 906, the access control application 136 can determine which token validation response 151 is most likely to occur based at least in part on the weight value of the token validation response probabilities 154 and using that most likely token validation response probability's 154 corresponding token validation response 151. Each of the token validation responses 151 can include a response code, status, or message to be delivered by the access control application 136. The token validation response 151 can determine whether access is granted to the data store 118

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 109.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
receive a data request comprising a token;
determine a predicted token validation response by processing the token through a hidden Markov model;
obtain, if the predicted token validation response indicates the token is valid, data from a secure data store; and
send a data response.

2. The system of claim 1, wherein the machine-readable instruction that determine a predicted token validation response, when executed, cause the computing device to at least:
identify token validation response probabilities based on a state of a token, wherein each of the token validation response probabilities corresponds to a token validation response;
determine a first token validation response probability having a highest probability value among the token validation response probabilities; and
choose the token validation response corresponding to the first token validation response probability.

3. The system of claim 1, wherein the token comprises an expiration datetime.

4. The system of claim 3, wherein the expiration datetime is expired and the predicted token validation response indicates that the token is invalid.

5. The system of claim 1, wherein the predicted token validation response indicates that the token is misconfigured and invalid.

6. The system of claim 1, wherein the data response comprises the data.

7. The system of claim 1, wherein the data response comprises a response code, wherein the response code indicates the token was invalid.

8. A method, comprising:
receiving a data request comprising a token;
determining a predicted token validation response by processing the token through a hidden Markov model;
obtaining, if the predicted token validation response indicates the token is valid, data from a secure data store; and
sending a data response.

9. The method of claim 8, wherein determining a predicted token validation response comprises:
identifying token validation response probabilities based on a state of a token, wherein each of the token validation response probabilities corresponds to a token validation response;
determining a first token validation response probability having a highest probability value among the token validation response probabilities; and
choosing the token validation response corresponding to the first token validation response probability.

10. The method of claim 8, wherein the token comprises an expiration datetime.

11. The method of claim 10, wherein the expiration datetime is expired and the predicted token validation response indicates that the token is invalid.

12. The method of claim 8, wherein the predicted token validation response indicates that the token is misconfigured and invalid.

13. The method of claim 8, wherein the data response comprises the data.

14. The method of claim 8, wherein the data response comprises a response code, wherein the response code indicates the token was invalid.

15. A method, comprising:
receiving a token comprising one or more attributes;
identifying a plurality of states for the token, wherein each state of the plurality of states comprises a validation rule and an access determination;
determining, based at least on the one or more attributes of the token, a first state from the plurality of states;
identifying state transition probabilities between the first state and the plurality of states;
choosing a second state from the plurality of states;
validating the token against the validation rule of the second state; and
sending a response comprising the access determination of the second state.

16. The method of claim 15, wherein at least one of the one or more attributes of the token include an expiration datetime and a scope of accessible materials.

17. The method of claim 15, wherein the second state from the plurality of states is chosen based at least in part on a highest probability value of the state transition probabilities.

18. The method of claim 15, wherein the first state is an unauthorized state, the second state is an authorized state, and the access determination of the authorized state indicates that the token is authorized to access data from the data store.

19. The method of claim 15, wherein the first state is an authorized state, the second state is an unauthorized state, and the access determination of the unauthorized state indicates that the token is unauthorized to access data from the data store.

20. The method of claim 15, wherein each of the state transition probabilities between the first state and the plurality of states is value inclusively between zero and one and a sum of each of the state transition probabilities between the first state and the plurality of states is equal to one.

\* \* \* \* \*